Figure 1:
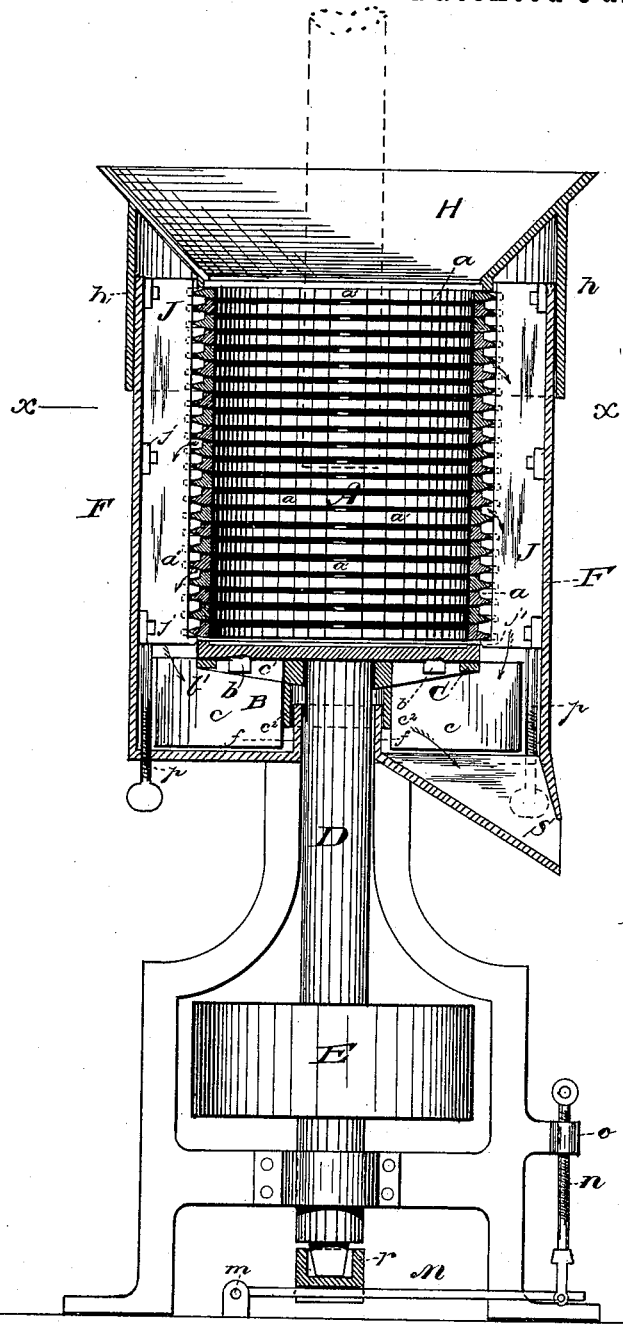

(No Model.)  2 Sheets—Sheet 1.

H. C. INGRAHAM.
REDUCTION MILL.

No. 323,040.  Patented July 28, 1885.

Attest:  Inventor:
F. F. Campbell  Henry C. Ingraham,
Oscar A. Michel.  by Drake & Co.,
  Attys.

(No Model.)  
2 Sheets—Sheet 2.
H. C. INGRAHAM.
REDUCTION MILL.
No. 323,040. Patented July 28, 1885.
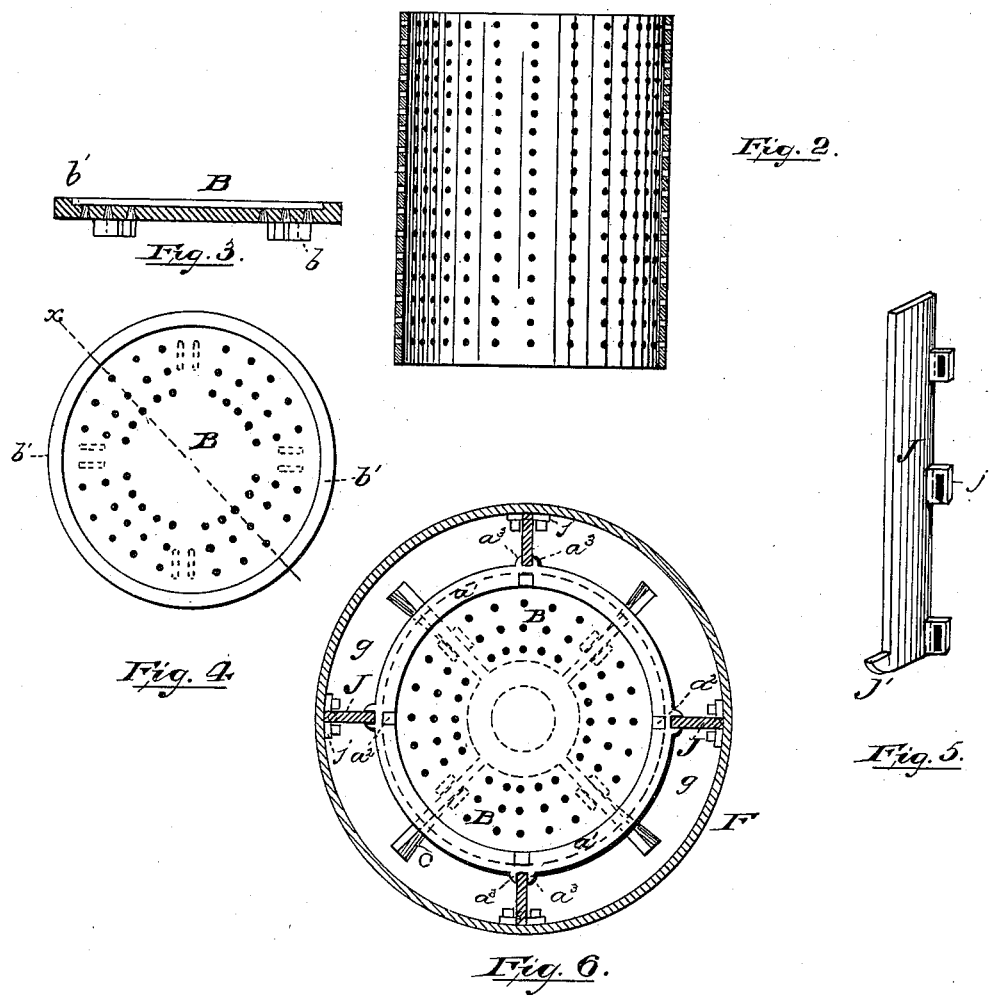
Attest:  
F. F. Campbell  
Oscar A. Michel
Inventor:  
Henry C. Ingraham,  
by Drake & Co.,  
attys.

UNITED STATES PATENT OFFICE.

HENRY C. INGRAHAM, OF WOODBRIDGE, NEW JERSEY.

REDUCTION-MILL.

SPECIFICATION forming part of Letters Patent No. 323,040, dated July 28, 1885.

Application filed September 15, 1884. (No model.)

*To all whom it may concern:*

Be it known that I, HENRY C. INGRAHAM, a citizen of the United States, residing at Woodbridge, in the county of Middlesex and State of New Jersey, have invented certain new and useful Improvements in Reduction-Mills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates, generically, to improvements in those machines employed in reducing various substances of granular form to powder, and specifically to such of those machines in which the reduction is obtained by the abrasion between the particles of the substances to be triturated; and it is designed to provide a machine simple and economical in construction and effective in operation, the material being rapidly and thoroughly pulverized and completely removed from the grinding-chamber and the machine.

This invention consists in the machine and the combinations of elements therein substantially as illustrated in the drawings, and described and claimed hereinafter.

In the accompanying drawings, comprising two sheets, Figure 1 is a vertical section of a machine illustrating my invention, taken centrally therethrough. Fig. 2 is a section of a perforated cylinder. Fig. 3 is a sectional view of a perforated plate, taken through line $x$ of Fig. 4, which is a plan of the same. Fig. 5 is a perspective view of one of the hangers, and Fig. 6 is a section through line $x\,x$ of Fig. 1, the fans and plate being moved around from their position in Fig. 1, so as to show them more clearly.

The machine herein selected to illustrate my invention is provided with a stationary grinding-chamber, A, preferably cylindrical in form, having openings or perforations $a$ in the walls thereof to admit of the escape of the ground material, and a revolving plate, B, in or at the bottom of said chamber, arranged upon a wheel, C, which is secured to a shaft, D, actuated by a pulley, E, as indicated in Fig. 1.

Around the grinding-chamber, and at a suitable distance therefrom, leaving an annular chamber, $g$, is arranged an outer casing, F, which extends down under the wheel C, forming a powder-receptacle, within which rotate the fan-wings $c$, which form a part of and turn with the wheel C, being cast therewith or bolted thereto, as desirable.

H is a telescopic hopper or feeding device, which rests upon the walls of the grinding-chamber, of which $h$ is the part that telescopes upon the outer casing, F.

The walls of the chamber A may be constructed in several ways. As shown in Figs. 1 and 6, a series of rings, $a'$, are laid one upon the other and separated by lugs $a^2$ on the tops or bottoms of the rings, as many as may be necessary, according to the size of the openings desired. On the outer circumference of said rings are arranged pairs of lugs $a^3$, which when the rings are placed one upon another form grooves, into which are inserted hangers J, which extend across the annular chamber $g$, being bolted to the outer casing, the bolts passing through the slotted lugs $j$, and are provided with projections $j'$, upon which the bottom rests, as indicated in Fig. 1. By this construction the rings are held firmly in place and prevented from moving either vertically or laterally. As will be noticed more particularly in Fig. 1, the rings are tapering toward the outer circumference, the openings between the rings being enlarged, thereby facilitating the exit of the powder from the grinding-chamber.

A greater or less number of rings may be employed, according to the capacity desired in the grinding-chamber, the telescopic hopper H allowing the insertion of more rings than are shown in the drawings, as will be understood. In removing or inserting the rings the telescopic device is lifted off, the rings taken out or inserted, and the hopper replaced, the operation being easily and rapidly done.

Instead of the rings, I may use a perforated cylinder, such as is shown in Fig. 2, but prefer to employ the rings hereinbefore described.

The plate B, mentioned above, is preferably provided with perforations therein, and is arranged in or at the bottom of the grinding-chamber A, upon the wheel C, being held thereon by the flanges $b$, which straddle the spokes or arms $c'$. Around the edge of the plate B is a raised portion, $b'$, which rotates directly beneath the bottom ring, as shown in Fig. 1, and provides a wearing-surface which can be elevated against said ring or lowered therefrom by means of the lever M, pivoted at $m$, and provided with a box, $r$, resting thereon, within which the lower end of the shaft rests. When the said lever is raised or lowered, being operated by the set-screw $n$, working in the arm $o$, it moves the shaft D and all the parts connected therewith. As shown in Fig. 3, the perforations in the plate B are tapering, so as to allow the pulverized material to escape more freely into the receptacle below.

In order that the rings, particularly the bottom one, can be adjusted in relation to the wearing-surface $b'$, I provide set-screws $p$, which pass through the bottom of the casing and engage with the bottom of each of the hangers, as in Fig. 1. By raising or lowering each or all of the said screws the hangers J and the parts connected therewith (the bolts in the lugs $j$ having previously been loosened) can be adjusted as desired.

$c^2$ and $f$ are boxes, a part of the wheel C and casing F, respectively, around the shaft D, to prevent the powder from collecting around the same as it falls into the receptacle.

The operation of the machine is as follows: The material to be pulverized is thrown into the chamber A upon the rapidly-revolving plate B, and the motion thereof being communicated to the material, it is rapidly and powerfully agitated in the chamber, the mass of material by its own action between the particles thereof being reduced to powder, which, as it is formed, is thrown out through the openings $a$ in the side walls into the annular chamber $g$ by the centrifugal force generated by the rapidly-revolving mass, a portion also escaping through the perforations $b$ in the revolving plate into the powder-receptacle.

The fans $c$ in the powder-receptacle serve a double purpose as they revolve therein—of acting as suction-fans in drawing the powder from the grinding-chamber into the receptacle, and also when the ground material falls into the receptacle they sweep the accumulating deposit around until it reaches the spout S and passes out therethrough.

The mill above described is adapted to grind ores, grains, or other substances, as may be desired. When grain is to be ground, I may feed it into the chamber A through a pipe, as dotted on Fig. 1. In this case the perforations are made small, so as to prevent the escape of the bran therethrough, which is forced up around the pipe into the hopper, where it can be removed, the inflowing grain preventing the rise of the bran in the pipe.

By arranging the grinding-chamber vertically in the mill the weight of the mass upon the particles below tends to facilitate the reduction, and also the escape of the powder which would not be thrown out through the side perforations is promoted by gravity through the perforations in the bottom plate.

As thus constructed all the parts liable to be affected by wear or broken can be easily and economically replaced.

Having thus described my invention, what I claim is—

1. In a reduction-mill, in combination, a vertical stationary grinding-chamber provided with openings or perforations in the walls thereof, a plate arranged and adapted to rotate at the bottom of said chamber, and mechanism adapted to rotate said plate, for the purpose set forth.

2. In a reduction-mill, in combination, a vertical stationary grinding-chamber provided with openings or perforations in the walls thereof, a perforated plate arranged and adapted to rotate at the bottom of said chamber, and mechanism adapted to rotate said plate, for the purpose set forth.

3. In a reduction-mill, in combination, a vertical stationary grinding-chamber provided with openings or perforations in the walls thereof, a perforated plate arranged and adapted to rotate at the bottom of said chamber, a revolving wheel upon which said perforated plate is arranged and by which it is rotated, and mechanism for actuating said wheel, all said parts operating for the purpose set forth.

4. In combination, in a reduction-mill, a grinding-chamber provided with openings or perforations in the walls thereof, a grinding or rotating plate, a casing arranged around and beneath said chamber, forming a powder chamber or receptacle therebetween, and provided with an exit for the powder in the bottom thereof, and a telescopic feeding device, through which the material to be pulverized is fed to the grinding-chamber, for the purpose set forth.

5. In a reduction-mill, in combination, a perforated stationary grinding-chamber, an outer casing surrounding said grinding-chamber and provided with an exit for the powder in the bottom thereof, a rotating plate arranged at the bottom of said grinding-chamber and connected with and rotated by a vertical driving-shaft, an exhaust-fan arranged beneath said rotating plate, and a vertical driving-shaft, all said parts being arranged and operating for the purposes set forth.

6. In a reduction-mill, the combination, with an outer casing, and a grinding-chamber arranged within said casing, composed of rings placed one above another, with openings therebetween, and provided with lugs on the outer circumference thereof, and a grinding or rotating plate, of hangers J, arranged between said lugs and secured to the outer casing, for the purposes set forth.

7. In a reduction-mill, the combination, with an outer casing, of a grinding-chamber formed by rings $a'$, arranged one above another, with openings therebetween, and having lugs $a^2$ on the outer circumference thereof, hangers J, arranged between said lugs, having projections j' and secured to the outer casing, and a grinding or rotating plate arranged and operating substantially as and for the purposes set forth.

8. A reduction-mill comprising an outer casing having a powder-exit in the bottom, a perforated stationary grinding-chamber arranged within said outer casing, a vertical driving-shaft, a wheel arranged upon the top of said driving-shaft at the bottom of the grinding-chamber, a perforated grinding-plate arranged upon said wheel, having lugs which engage with the spokes of said wheel, an exhaust-fan placed beneath the perforated plate, overlapping boxes $f$ and $c$, and mechanism for adjusting the vertical shafts and parts secured thereto in relation to the grinding-chamber, substantially as specified.

In testimony that I claim the foregoing I have hereunto set my hand this 29th day of August, 1884.

HENRY C. INGRAHAM.

Witnesses:
OLIVER DRAKE,
I. FREEMAN ROWLAND.